United States Patent [19]

Crawford et al.

[11] Patent Number: 4,457,568
[45] Date of Patent: Jul. 3, 1984

[54] BEARING SUPPORT STRUCTURE

[75] Inventors: William K. Crawford, Longueuil; Ronnie Kovacik, St. Bruno, both of Canada

[73] Assignee: Pratt & Whitney Canada Inc., Longueuil, Canada

[21] Appl. No.: 460,003

[22] Filed: Jan. 21, 1983

[51] Int. Cl.³ .............................................. F16C 33/58
[52] U.S. Cl. .................................. 308/207 A; 308/216
[58] Field of Search .................. 308/207 A, 216, 202, 308/207 R, 184 R

[56] References Cited

U.S. PATENT DOCUMENTS 3,976,340  8/1976  Pitner .................................. 308/216
4,058,157 11/1977  Wiegard .............................. 308/202
4,201,426  5/1980  Garten et al. ..................... 308/207 A
4,235,128 11/1980  Kanervo et al. ..................... 308/216

Primary Examiner—Lenard A. Footland
Attorney, Agent, or Firm—Fleit, Jacobson, Cohn & Price

[57] ABSTRACT

A bearing support structure is provided in a gas turbine engine with a support structure mounted to the outer casing of the engine, and the structure defines an annular seat concentric with a rotating shaft. A cylindrical solid sleeve is seated in the annular seat so formed and extends axially therefrom in a cantilever manner and is provided with an outer bearing raceway for roller bearings, the outer raceway being constructed in out-of-round such that when the bearing structure is inserted in the outer raceway, it will assume a circular configuration providing a load on the roller bearings.

6 Claims, 3 Drawing Figures

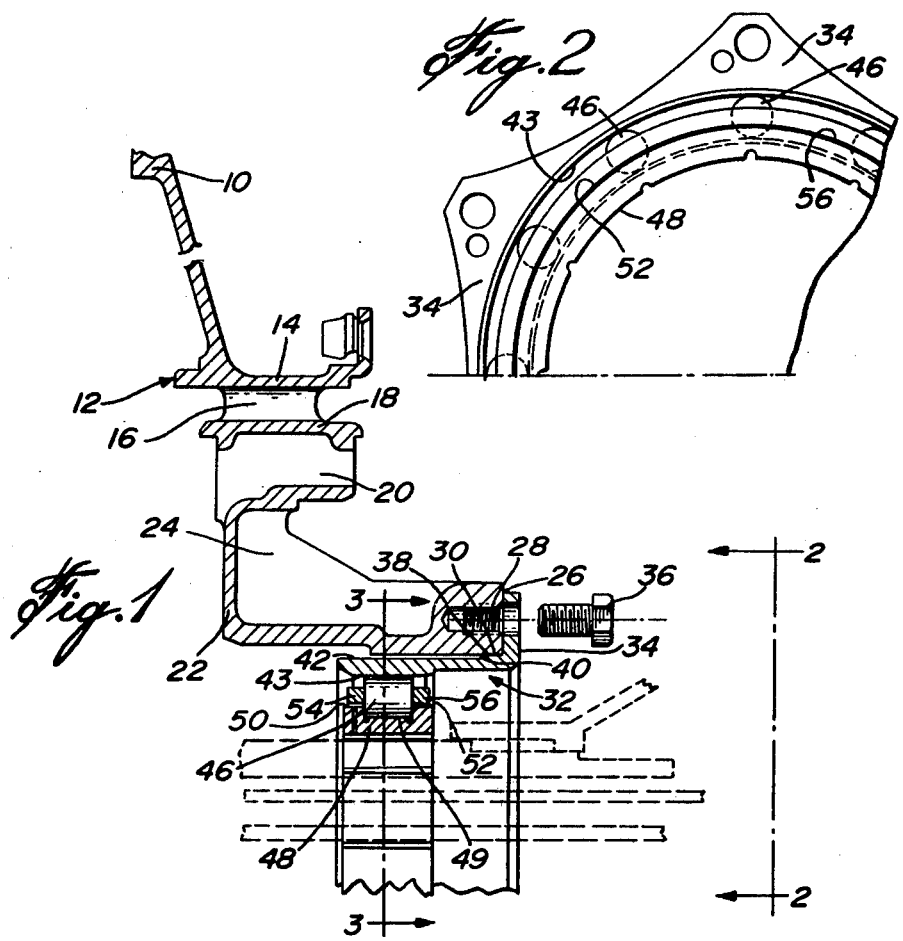
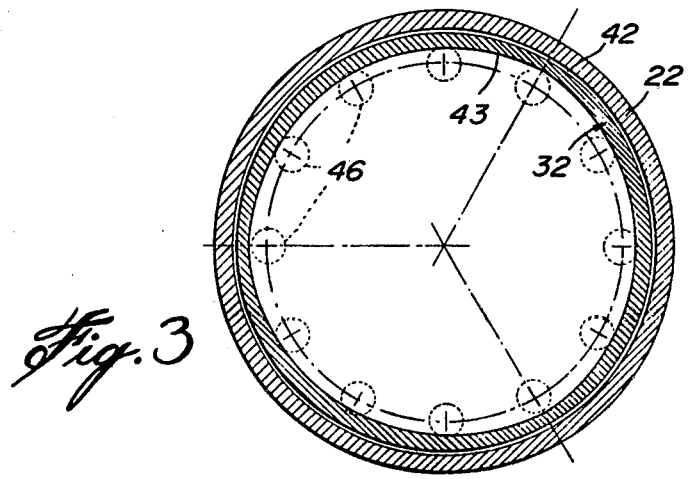

BEARING SUPPORT STRUCTURE

BACKGROUND OF THE INVENTION

1. Field of the Invention

The present invention relates to bearing mountings, and more particularly, to a bearing mounting for a shaft in a gas turbine engine.

2. Description of the Prior Art

In order to avoid slippage or skidding of roller bearings, the rollers and an inner race can be inserted into an outer race or support which is slightly "out-of-round". Out-of-round means that the outer race is slightly oval with the minor axis of the race (determined by the inner raceway of the outer race) being less than the diameter of the circumference of a circle tangent to the outer surfaces of the assembled bearing rollers. When the assembled bearing rollers and inner race are pressed into the outer race, the inner raceway of the outer race will be forced to assume a circle, and thus a constant load is forced on the rollers, preventing slippage of the rollers. The outer race could also have curvilinear triangular configuration in its out-of-round shape. The out-of-round shape of the inner raceway may be obtained by first providing a right cylindrical race with a circular inner raceway and then machining the inner raceway to a curvilinear triangular shape.

Most conventional out-of-round race configurations are provided in bearing supports which are in the same radial plane as the bearing. The bearing supports are normally structurally connected to the engine casing in the case of a gas turbine engine. Thus, the preloading of the bearing by out-of-round configuration of the outer race can only be adjusted with difficulty in view of very limited tolerances which can be provided between the outer race and the remaining bearing support structure.

SUMMARY OF THE INVENTION

It is an aim of the present invention to provide an improved bearing structure, wherein preloading of the bearing can be provided without regard to tolerances with the bearing supports. Thus, the stiffness of the bearing assembly need not influence the preload on the bearing.

A construction in accordance with the present invention comprises an outer casing and at least one internal shaft means mounted for rotation in a plurality of bearings, at least one of said bearings being a roller-type bearing, bearing support means for said roller-type bearing mounted to said casing. The bearing support means defines a first annular seat concentric with the shaft means. A cylindrical solid sleeve forms an outer race member having at one end thereof an out-of-round raceway for receiving the rollers of the roller-type bearing, and the other end of said cylindrical solid sleeve is mounted in said first annular seat of said bearing support means such that the sleeve supports the bearings in a cantilever manner. The preload on the bearing can be adjusted by the length and thickness of the sleeve, and the degree of out-of-round of the outer raceway.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary axial cross-section of a gas turbine engine incorporating the present invention;

FIG. 2 is a fragmentary radial elevation taken in the direction of arrow 2 in FIG. 1; and FIG. 3 is a radial cross-section taken along line 3—3 of FIG. 1.

DESCRIPTION OF THE PREFERRED EMBODIMENTS

The drawings, particularly FIG. 1, show a detail of the bearing support 12 mounted within the engine casing 10 in relation to a particular gas turbine engine design. However, it is evident that the structure could be adapted in any bearing structure, especially in relation to gas turbine engines. The structure illustrated in the present invention includes a bearing support 12 having, for instance, an annular retaining ring 14 with a concentric annular ring 18 connected thereto by spaced-apart struts 16. A cylindrical cage 22 is concentric with the annular ring 18 and is connected thereto by spaced-apart struts 20. The cage 22 includes spaced-apart, radial, reinforcing webs 24.

The cage 22 includes a radial planar surface 26 provided with a plurality of threaded bores 28 adapted to receive a flange 34 with machine bolts 36, as will be described further. The cylindrical cage 22 is also provided with an annular seat 30. A cylindrical race 32 having a flange 34 is adapted to be received by the cylindrical cage 22, and in particular, a built-up annular engagement surface 38 is adapted to be in contact with the seat 30 of the cage 22. Bolts 36 affix the flange 34 to the cage 22.

The race 32 is in the form of a right circular cylinder and includes a step 40, and an outer race surface 42 having a diameter smaller than the engagement surface 38. The race 32 has a predetermined length and thickness. A radial gap is provided between the outer surface 42 and the cage 22 axially beyond the step 40. At the other end of the race 32, an outer raceway 43 is provided for a roller bearing structure. The outer raceway 43 is axially spaced from the end of the cylinder engaged by the annular seat 30, and thus the race 32 in a cantilevered bearing support structure.

As shown in FIG. 3, the outer raceway 43 is out-of-round before receiving the roller bearing 46 and is machined in a curvilinear triangular configuration, as shown. The bearing per se includes an inner race 48 with rollers 46 running in the inner raceway 49. The inner race 48 also includes annular lands 50 and 52 and bearing cages 54 and 56.

Since there is no direct radial support against the outer surface 42 of the outer race 32, the outer race 32 will be allowed to be deformed as the roller bearing structure is inserted therein, forcing the out-of-round configuration of the outer raceway 43 to assume a round or circular configuration with the roller bearings 46 therein. The load on the bearings can be adjusted by properly selecting the length of the cylindrical race 32, particularly the unsupported span between the seat 30 and the radial plane of the outer raceway 43. Further, by adjusting the thickness in the lengthwise direction of the cylindrical sleeve of race 32, the load can be predetermined on the roller bearings. A factor influencing the preload is also the degree of out-of-roundness applied to the outer raceway 43. Preferably, a load of 75 to 150 lbs. would be required in a small scale turbine engine of the type illustrated. For instance, the diameter of the roller bearing path is approximately 3½ inches, while the shaft speed would be in the area of 34,000 rpm.

In a specific embodiment, the axial length of the cylindrical race 32 measured from inside the flange 34 was 1.15 inches, while the thickness of the race 32 in the area of the outer raceway 43 was 0.12 inches, and the wall thickness of the cylinder between the raceway 43 and the engagement surface 38 was 0.07 inches.

If it is required to increase the load on the roller bearings 46, it would be necessary, therefore, to stiffen the cantilevered cylindrical race 32 by allowing the walls to be slightly thicker, particularly in the area between the raceway 43 and the engagement surface 38. Likewise, if it is required to reduce the load, then this wall thickness could be reduced in thickness. Similarly, the lengthening of the cantilevered cylindrical race 32, given the same wall thickness, would tend to lower the load on the bearings. Actually, once the cylinder is sufficiently long to avoid the stiffness introduced by the seat, the bearing load would be controlled by the degree of out-of-round of the raceway, not by adjustment of the cylinder wall thickness.

We claim:

1. A bearing support structure comprising an outer casing, at least one internal shaft means mounted for rotation in a plurality of bearings, at least one of said bearings being a roller-type bearing, bearing support means for said roller-type bearing mounted to the casing, the bearing support means defining a first annular seat concentric with the shaft means, a cylindrical solid sleeve forming an outer race member having at one end thereof an out-of-round outer raceway and the other end of said cylindrical solid sleeve being mounted in said first annular seat of said bearing support means such that the sleeve supports the bearings in a cantilevered manner and the preload on the bearing can be adjusted by varying the length and/or the thickness of the sleeve and/or by varying the degree of out-of-round of the outer raceway.

2. A bearing support structure as defined in claim 1, wherein the bearing support structure is utilized in a gas turbine engine.

3. A bearing support structure as defined in claim 1, wherein the out-of-round outer raceway is in the form of a curvilinear triangle, and the raceway is made to assume a circular configuration when the roller bearing structure is inserted therein, providing a preload on the roller bearings.

4. A bearing support structure as defined in claim 3, wherein the preload is in the range of 75 to 150 lbs. and wherein the diameter of the outer raceway is less than 6 inches and the operating rpm of the shaft means is in the area of 34,000 rpm.

5. A bearing support structure as defined in claim 4, wherein the length of the unsupported span of the sleeve forming the race is 1.15 inches and the thickness of the wall of the sleeve is between 0.05 inches and 0.10 inches.

6. A bearing support structure as defined in claim 1, wherein the out-of-round outer raceway is in the form of an oval.

* * * * *